Feb. 10, 1925.

R. R. BLOSS 1,525,636

BOLT STRUCTURE

Filed Aug. 6, 1923   2 Sheets-Sheet 1

Richard R. Bloss
INVENTOR.

BY

Edwin P. Corbett
ATTORNEY.

Feb. 10, 1925.
R. R. BLOSS
BOLT STRUCTURE
Filed Aug. 6, 1923
1,525,636
2 Sheets-Sheet 2
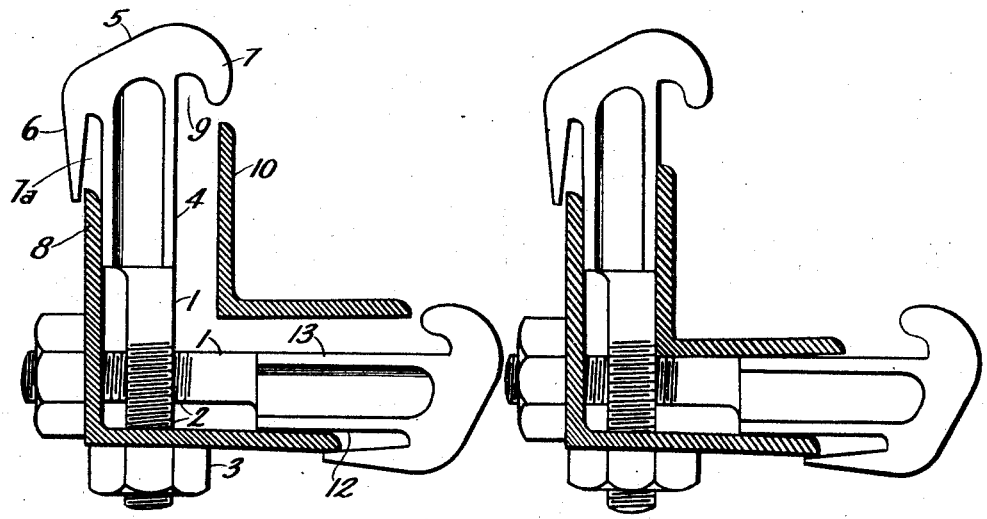
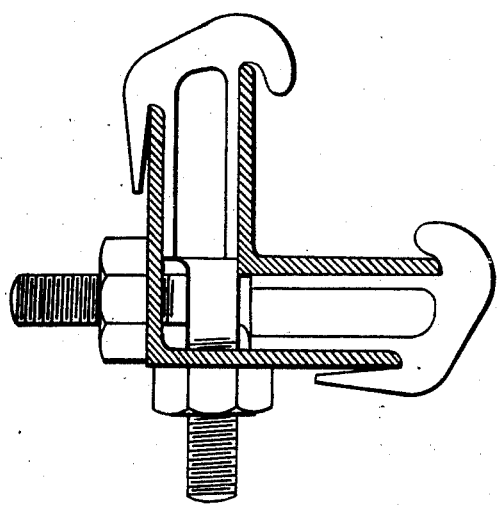
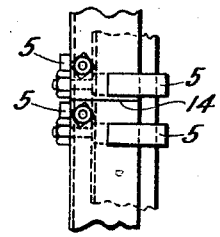
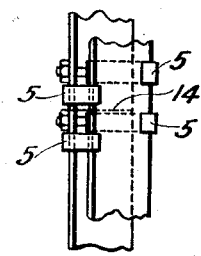
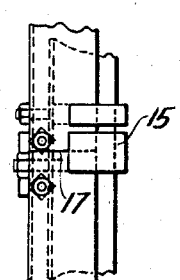

Patented Feb. 10, 1925.

1,525,636

UNITED STATES PATENT OFFICE.

RICHARD R. BLOSS, OF COLUMBUS, OHIO, ASSIGNOR TO THE INTERNATIONAL DERRICK AND EQUIPMENT COMPANY, OF COLUMBUS, OHIO, A CORPORATION OF OHIO.

BOLT STRUCTURE.

Application filed August 6, 1923. Serial No. 655,909.

*To all whom it may concern:*

Be it known that I, RICHARD R. BLOSS, a citizen of the United States of America, residing at Columbus, in the county of Franklin and State of Ohio, have invented certain new and useful Improvements in Bolt Structures, of which the following is a specification.

My invention relates to a novel form of bolt structure which is particularly useful in connection with the reinforcements of towers, bridges or other structures.

One of the important features of my invention has to do with the provision of a novel form of bolt structure which is so related to the main units of the structure and the reinforcing units thereof that these units while being separable are capable of assemblage with such compactness and rigidity that the strength of the units in combination are very materially in excess of the aggregate strength of the units.

Another feature of importance which results from the novel type of bolt structure is the great reduction in the number of necessary bolt holes for any given tower structure and, also, the great reduction in the necessity for the use of bolt holes which must be brought into registering relation during assemblage of the tower structure.

One of the important reasons for the increased strength of a structure when my invention is utilized therein results from the fact that my novel form of bolt structure comprises claws which grip adjacent edges of the angle irons or other members used with a wedging grip. The structure and action is such that the legs of the adjacent irons are not only gripped against separation under stress but are likewise braced apart. The bracing action is preferably accomplished by means of prolonged contacting surfaces on the bolt structure and on the irons.

Another important feature of my invention is the spacing of the two angle irons from each other when in fast position. This is accomplished by the squared portion of the bolts. The added strength given to a member of the tower structure through the spacing of the two angle irons can be varied by the use of bolts of various sizes thus varying the distance maintained between the outer and inner angle irons. Preferably, however, sufficient distance is maintained between the angle irons to cause the unit to exert the same degree of strength or rigidity in all directions.

By staggering the joints of the reinforcing leg sections of my structure with relation to the joints of the main units thereof and by using my novel form of bolt structure, I am able to provide and do provide a rigid means for connecting the abutting ends of leg sections without the necessity of sockets on one or more of such leg sections. This is preferably accomplished by a plurality of bolts, one above and one below each joint although a single bolt of sufficient width may span each joint and effect a rigid connection.

Figure 4 is a cross section of a reinforced leg section immediately before the reinforcement is applied.

Figure 5 is a view similar to Figure 4 but with the reinforcement applied, though the bolts have not been drawn into final operative position. This figure also shows how deformed legs of the angle members are drawn into position by means of the wedging action of the legs on the hook bolts.

Figure 6 is a view similar to Figures 4 and 5 with the bolts drawn into final operative position and showing the connection of the deformation shown in Fig. 5.

Figure 7 is a side elevation of a derrick structure wherein the clamping bolts are so utilized that no socket connection is necessary between the abutting ends of leg sections.

Figure 8 is a similar view taken at right angles to Fig. 7.

Figure 9 is a side elevation of derrick structure wherein, by a modified bolting structure, no socket connection is necessary.

Figure 10 is a similar view taken at right angles to Figure 9. In this view the abutting ends of the reinforcing members have been separated to show the detail construction of the socket.

Figure 1:
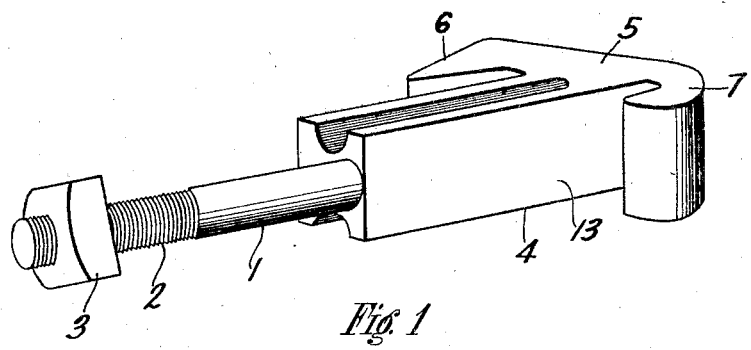
Figure 1 is a perspective view of my novel type of bolt.
Figure 2:
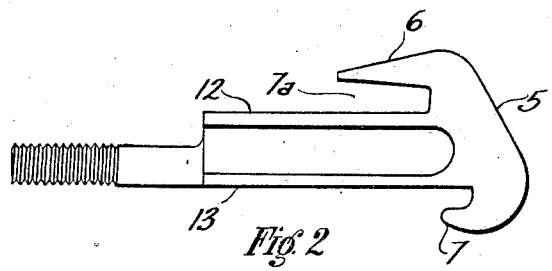
Figure 2 is a plan view of the bolt shown in Fig. 1.

In the drawings wherein my bolts are shown applied to a derrick structure of angle irons, the bolt structure of my invention is shown as comprising a shank 1 threaded on one end as at 2 for the reception of a nut 3. Upon the opposite end of this shank 1, is provided an integral angular formation 4 which terminates in a claw head 5 having a relatively long claw 6 and a relatively short claw 7.

The provision of the claw 6 results in a wedge-like space 7ª for the reception of one edge 8 of an angle iron. The provision of the claw 7 results in a relatively short wedge-like space 9 for the reception of an edge 10 of an inner angle iron.

Figure 3:
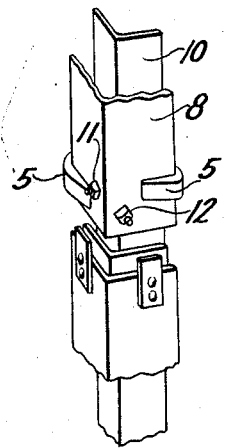
Figure 3 is a perspective view of the outside of a reinforced member with my clamping structure applied.

As shown in Figures 3 and 4 these bolts are preferably used in pairs in superimposed relation to each other. The shanks of these pairs of bolts pass through holes 11 and 12 of the opposite legs of the outer angle iron.

One of the reasons for the provision of claws of different length is illustrated in Figures 4, 5 and 6 wherein it is shown that the longer claws may be adjusted into position to embrace the edges of the outer angle iron to an extent sufficient to prevent rotation of the bolts during assemblage of the tower structure. At the same time, it will be noted that there is still left a sufficient clearance for the inner angle iron to pass between the short claws of the two bolts preliminary to a tightening of these bolts and a consequent drawing of the claws 6 into wedging position upon the edges of the outer angle iron and the claw 7 into wedging position upon the edges of the inner angle iron.

When this final wedging position is attained, it will be noted that the opposing surfaces of the inner and outer angle irons are drawn into firm contact with the surfaces 12 and 13 of the angular portions 4 of the bolts.

As shown in Figures 7 and 8, a socket structure between abutting ends of leg sections may be done away with by the provision of two pairs of bolts 5 upon an intermediate point of an inner leg section in such a position that they grip the outer leg sections upon opposite sides of a joint 14. It will readily be seen that this results in holding the sections firmly in assembled relation without the use of juncture sockets.

By referring to Figures 9 and 10 it will be seen that similar results may be attained by providing a pair of bolts with their claw structures widened as at 15 to such an extent that they span the joint 17 of the outer leg sections to an intermediate point of the inner leg section.

It will be seen from this description that I have provided a tower structure wherein, by the use of a novel type of bolt, it is possible to so clamp the inner and outer sections of the tower together that they become in effect substantially single units. The legs of the angle irons are so firmly gripped that they cannot materially separate and at the same time they are rigidly braced apart by the shanks of the bolts. Furthermore, it is only necessary to provide bolt holes in the outer sections. This in itself very greatly reduces the number of necessary bolt holes and practically does away with the difficulties of causing bolt holes to register which will of necessity result in a great saving of time and labor. It will further be apparent that I have provided a means for firmly maintaining the abutting ends of leg sections in proper relative position without the necessity of providing sockets and in doing away with the necessity for this structure have strengthened rather than weakened the tower. It will be understood that my device is not limited to the use of maintaining the abutting ends of a leg section in proper relation but may also be used in strengthening a section of the tower throughout its length. This is accomplished by clamping to the section an angle iron of equal length. It will further be understood that my bolt structure is not limited in its application to use in connection with angle irons of the type shown. On the contrary, it is readily applicable under similar or modified forms to Z-irons, T-irons, and to numerous other constructions, and I intend to embrace these in the term "angle member" or "angle irons" wherever used.

Having thus described my invention, what I claim is:

1. Means for securing an outer angle member to an inner angle member comprising means tending to pull the inner angle member towards one leg of the outer member, and means tending to pull the inner angle member towards the other leg of the outer member, said two means each comprising a bolt which grips the edges of the legs of inner and outer angles and draw them together.

2. Means for securing an outer angle member to an inner angle member comprising means tending to pull the inner angle member towards one leg of the outer member, and means tending to pull the inner angle member towards the other leg of the outer member, said two means each comprising a bolt which grips the edges of the legs of inner and outer angles and draws them together, said bolts also serving to brace said legs apart.

3. Means for connecting an outer angle to an inner angle comprising bolt structure which passes through one angle and directly grips and holds the other angle in fixed position thereto.

4. Means for securing an outer angle to an inner angle comprising bolts which grip the edges of the legs of the inner and outer angles and draw them together, said bolts also serving to brace said legs apart.

5. Means for securing an outer angle to an inner angle comprising bolts which grip the edges of the legs of the inner and outer angles and draw them together, said bolts being of such structure and so connected to one angle that they can be adjusted to embrace the edges of the said angle and permit of the emplacement of the other angle.

6. A connecting means for angle members whose legs are parallel with each other comprising a bolt which grips the edges of the angle legs and extends into position to brace such legs apart.

7. A connecting means for angle members disposed in nested relation comprising hook bolts which grip the edges of the legs of said angle members and draw them together.

8. A connecting means for angle members disposed in nested relation comprising hook bolts which grip the edges of the legs of said angle members and draw them together, one hook being larger than the other.

9. A connecting means for angle members arranged in nested relation comprising hook members which grip the edges of the legs of said members and exert pulls on such edges at angles to each other.

10. A connecting means for angle members comprising a double hook bolt which grips adjacent edges of the legs of said angle members with a wedging action, one hook being longer than the other.

11. A connecting means for angle members comprising a double hook bolt which grips adjacent edges of the legs of said angle members with a wedging action said bolt being directly supported by one of said legs.

12. A connecting means for angle members comprising a unit bolt structure which hooks over the edges of the legs of adjacent angle members and tends to draw such angle members together while at the same time bracing such members apart.

13. In tower structure the combination of inner and outer legs formed in sections disposed in staggered relation and wedge bolts for connecting the inner sections to the outer sections.

14. In tower structure the combination of inner and outer legs formed in sections disposed in staggered relation and wedge bolts for connecting the inner sections to the outer sections, said wedge bolts being disposed adjacent and on opposite sides of the joints of abutting leg sections.

15. In tower structure the combination of inner and outer legs formed in sections and bolt structure for connecting said legs together, one end of said connecting bolt passing through one leg and the other end engaging and gripping the other leg.

16. In tower structure the combination of inner and outer legs disposed in nested relation and bolt structure for clamping and drawing said legs together, said bolts being of such structure that they can be adjusted to embrace one leg and permit of the free emplacement or removal of the other leg.

17. Means for securing an outer angle to an inner angle comprising bolt structure for connecting and holding said angles in nearly fixed position, said bolts being of such structure that they can be adjusted to embrace and be held in position by one angle and permit of the emplacement or removal of the other angle.

18. Means for connecting an outer angle to an inner angle comprising integral bolt structure which passes through one angle and directly grips and holds the other angle, said bolt structure also serving to brace said angles apart.

19. In tower structure the combination of inner and outer legs arranged in reinforcing relation and bolt structure for connecting said legs together, said bolt structure in one position engaging with and being held in place by one leg member and in another position engaging with and clamping together both leg members.

20. In tower structure the combination of leg members disposed in nested relation and connecting means extending between and spacing the legs apart and for gripping the edges of such legs.

21. Connecting means for angle members disposed in nested relation comprising bolts which grip the edges of the legs of the nested angle members and draw them together.

In testimony whereof I hereby affix my signature.

RICHARD R. BLOSS.